Figures 1, 1A:
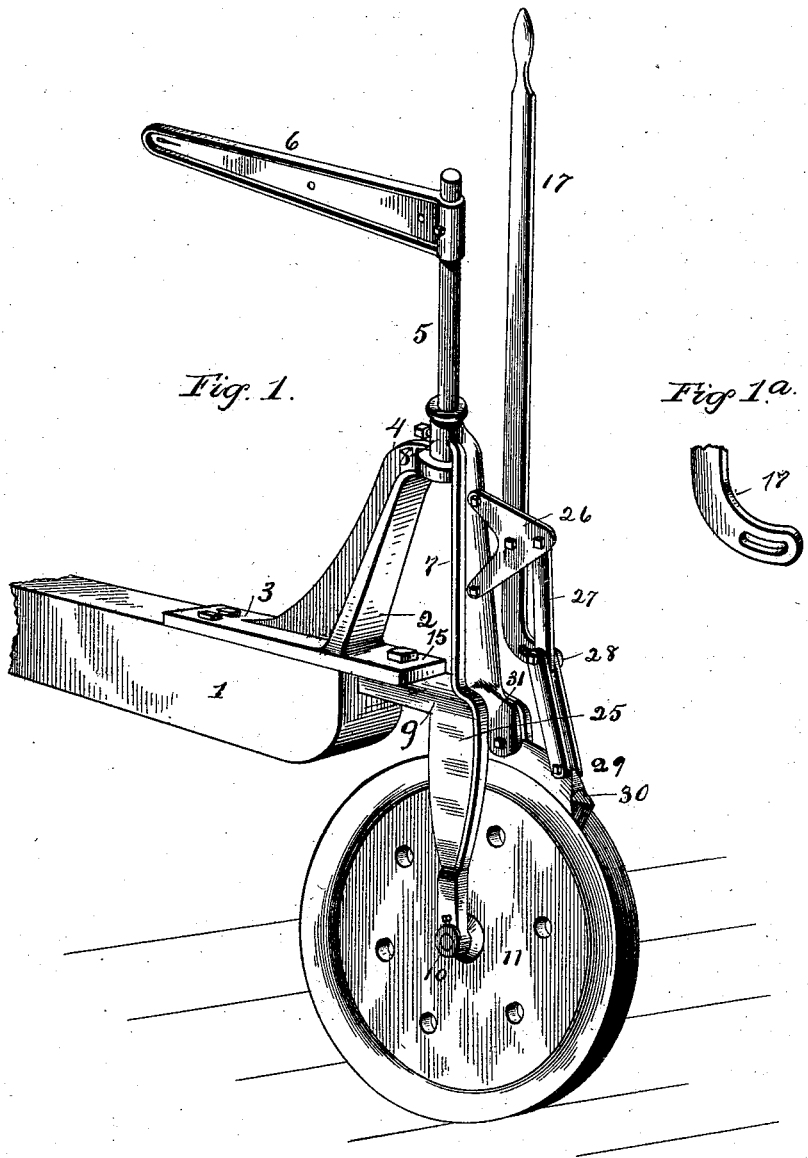

(No Model.)

O. B. HOLLIS.
HARVESTER HEADER.

No. 506,504. Patented Oct. 10, 1893.

Witnesses
J. M. Fowler, Jr.
T. K. Stuart.

Inventor
Orlando B. Hollis.
By Marble, Mason & Canfield,
Attorneys.

UNITED STATES PATENT OFFICE.

ORLANDO B. HOLLIS, OF SPOKANE, WASHINGTON.

HARVESTER-HEADER.

SPECIFICATION forming part of Letters Patent No. 506,504, dated October 10, 1893.

Application filed August 18, 1891. Serial No. 403,065. (No model.)

*To all whom it may concern:*

Be it known that I, ORLANDO B. HOLLIS, a citizen of the United States, residing at Spokane, in the county of Spokane and State of Washington, have invented certain new and useful Improvements in Harvester-Headers; and I do hereby declare the following to be a full, clear, and exact description of the invention, such as will enable others skilled in the art to which it appertains to make and use the same.

My invention relates, generally, to improvements in harvester headers, and it consists in an improved form of brake, which is designed to be attached to and bear upon the tiller or rudder wheel of the harvester, which will be hereinafter fully described, and particularly pointed out in the claims.

The object of my invention is to provide means for perfectly controlling the movement of the harvester when it is going down hill, without in any way interrupting the operation of the actuating mechanism of the cutters, so that the cutters may perform their work at a uniform speed, and with perfectness and precision. This object I accomplish by the use of the improved form of brake which is shown in the drawings accompanying and forming a part of this application, Figure 1 of which shows the brake in operative position on the tiller wheel of a harvester header, and Fig. 1ª of which is a detail view of the lower portion of the lever 17.

Referring to the drawings, the reference numeral 1 indicates the tongue of the harvester. 2 is a standard, having a flat face 3, which is bolted or otherwise secured to the upper surface of the rear end of the harvester, and having the right-angled rearward extension 4 at its upper end, which, as the standard is slightly rearwardly inclined, projects over the rear of the harvester tongue. In the right-angled extension 4 is formed an opening through which the tiller shaft 5 passes, to the upper end of which shaft is attached the tiller lever 6.

7 indicates a vertical bracket, which is bent forwardly at its upper end, and provided with the boss 8, through which the vertical tiller shaft passes. This boss fits over the right-angled extension, 4, and is keyed or otherwise secured to said tiller shaft. Near its lower end, the bracket 7 is provided with a forwardly-projecting extension 9, which sets under, and is pivoted to the rearwardly projecting extension 15 of the base 3. At its lower end the bracket 7 is formed with the female or bifurcated casting 25, on the horizontal pin 10, which passes through the two portions of which, is mounted the tiller wheel 11. This tiller wheel may be of any ordinary construction, but the form I have represented has a grooved periphery, which enables the operation of the brake to be more certain.

Midway of the length of the bracket 7 is attached the triangular bracket 26, upon which the lever 17 is pivoted and swings. Pivoted to the upper arm of said bracket is the upper arm 27 of the toggle-joint 28, the lower arm 29 of which being pivotally connected to the brake block 30, which is pivoted at its front end between the lugs 31 of the bifurcated casting 25, thus making a loose and freely movable joint. The lower end of the lever 17 is pivoted to the toggle joint at the point of connection of its two members, and is formed with a slot in order to permit of the radial movement of the toggle joint, which results from the application of the lever. This slot is shown in Fig. 1ª.

The operation of my brake is as follows: When the lever 17 is pushed or pulled backward, the toggle-joint and the brake block are raised, and the latter is removed from the groove in the periphery of the tiller wheel 11. When said lever is pushed forward, the brake block is forced downward within the groove in the periphery of said tiller wheel, and thus the same is effectually braked. Thus in order to control the motion of the harvester, it is only necessary for the driver to apply the brake, and, as the tiller wheel has no connection with the operating mechanism of the cutters, it is evident that they will accomplish their work without interruption.

Having thus fully described my invention, what I desire to secure by Letters Patent, is—

1. The combination with a wheel having a grooved periphery, of a brake block, pivoted at one end to the supporting bracket of the wheel, a toggle joint connected at one end to the free end of said brake block, and at the other end to a casting attached to the supporting bracket of the wheel, and a lever, pivoted to said casting, and attached to the toggle-joint at the point of connection of its two members, substantially as described.

2. The combination with the tongue of a harvester, of the standard 2 attached to the same; the tiller shaft 5 revolubly mounted on said standard; the bracket 7, between the lower, bifurcated ends of which is pivoted the tiller wheel 11, and which is attached at its upper end to the tiller shaft, and pivoted near its lower end to the standard 2; the brake block 30, pivoted at one end to the lugs 31 formed on the bracket 7; the toggle-joint 28, attached at one end to the free end of said brake block, and at the other end to the casting 26, which casting is attached to the bracket 7; and the lever 17, pivoted to said casting 26, and attached to the toggle joint at the point of connection of its two members, substantially as described.

In testimony whereof I affix my signature in presence of two witnesses.

ORLANDO B. HOLLIS.

Witnesses:
 GEO. P. CRAGIN,
 G. W. JACKSON.